United States Patent
Musy et al.

(10) Patent No.: US 12,449,903 B2
(45) Date of Patent: Oct. 21, 2025

(54) VEHICLE INTERIOR TRIM ELEMENT WITH HAPTIC FEEDBACK FUNCTION

(71) Applicant: Faurecia Innenraum Systeme GmbH, Hagenbach (DE)

(72) Inventors: Maxime Musy, Karlsruhe (DE); Bogdan Braicu, Strasbourg (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 183 days.

(21) Appl. No.: 18/080,383

(22) Filed: Dec. 13, 2022

(65) Prior Publication Data

US 2023/0185379 A1    Jun. 15, 2023

(30) Foreign Application Priority Data

Dec. 13, 2021  (DE) .................. 10 2021 214 257.5

(51) Int. Cl.
*G06F 3/01* (2006.01)
*B32B 5/02* (2006.01)
(Continued)

(52) U.S. Cl.
CPC ............ *G06F 3/016* (2013.01); *B32B 5/02* (2013.01); *B32B 9/025* (2013.01); *B32B 21/14* (2013.01);
(Continued)

(58) Field of Classification Search
CPC ............ G06F 3/016; G06F 3/044; G06F 2203/04102; G06F 3/041; B32B 5/02;
(Continued)

(56) References Cited

U.S. PATENT DOCUMENTS

2009/0322496 A1*  12/2009  Da Costa ............. G06F 3/016
                                                              345/173
2014/0191973 A1*  7/2014  Zellers ................. G06F 1/1632
                                                              340/407.2
(Continued)

FOREIGN PATENT DOCUMENTS

DE    102014211239 A1    12/2015
DE    102015015417 A1    6/2017
(Continued)

OTHER PUBLICATIONS

Search Report issued in German Patent Application No. 10 2021 214 257.5, dated Aug. 5, 2022.

*Primary Examiner* — Quan Zhen Wang
*Assistant Examiner* — Rajsheed O Black-Childress
(74) *Attorney, Agent, or Firm* — Nelson Mullins Riley & Scarborough LLP

(57) ABSTRACT

A vehicle interior trim element with haptic feedback function includes an elastic base layer that gives the vehicle interior trim element a soft feel, and a flexible cover layer. The flexible cover layer includes an electrically insulating top layer disposed on the visible side of the vehicle interior trim element, an electrically conductive sensor layer disposed between the upper layer and the base layer, and a piezoelectric actuator layer disposed between the sensor layer and the base layer. The sensor layer is configured to detect contact with the upper layer without deformation and to localize a corresponding contact area. The actuator layer is configured to provide haptic feedback.

20 Claims, 1 Drawing Sheet

(51) Int. Cl.

| | |
|---|---|
| *B32B 9/02* | (2006.01) |
| *B32B 9/04* | (2006.01) |
| *B32B 21/08* | (2006.01) |
| *B32B 21/14* | (2006.01) |
| *B32B 27/12* | (2006.01) |
| *B60K 35/00* | (2024.01) |
| *B60K 35/10* | (2024.01) |
| *B60R 13/02* | (2006.01) |
| *G06F 3/044* | (2006.01) |

(52) U.S. Cl.
CPC .............. *B60K 35/00* (2013.01); *B60K 35/10* (2024.01); *B60R 13/02* (2013.01); *G06F 3/044* (2013.01); *B32B 9/045* (2013.01); *B32B 21/08* (2013.01); *B32B 27/12* (2013.01); *B32B 2307/20* (2013.01); *B32B 2307/202* (2013.01); *B32B 2307/206* (2013.01); *B32B 2307/41* (2013.01); *B32B 2307/51* (2013.01); *B32B 2307/536* (2013.01); *B32B 2307/54* (2013.01); *B32B 2307/732* (2013.01); *B32B 2457/00* (2013.01); *B32B 2605/003* (2013.01); *B60K 2360/1434* (2024.01); *B60K 2360/1446* (2024.01); *B60R 2013/0287* (2013.01); *G06F 2203/04102* (2013.01)

(58) Field of Classification Search
CPC ......... B32B 9/025; B32B 21/14; B32B 9/045; B32B 21/08; B32B 27/12; B32B 2307/20; B32B 2307/202; B32B 2307/206; B32B 2307/41; B32B 2307/51; B32B 2307/536; B32B 2307/54; B32B 2307/732; B32B 2457/00; B32B 2605/003; B32B 15/088; B32B 15/095; B32B 27/065; B32B 27/302; B32B 27/36; B32B 5/026; B32B 5/18; B32B 2307/7376; B32B 15/046; B32B 15/082; B32B 15/085; B32B 15/09; B32B 15/14; B32B 27/08; B32B 27/304; B32B 27/32; B32B 27/34; B32B 27/365; B32B 27/40; B32B 9/02; B32B 3/08; B32B 9/04; B32B 15/00; B32B 27/00; B32B 27/06; B60K 35/00; B60K 35/10; B60K 2360/1434; B60K 2360/1446; B60K 35/25; B60K 37/20; B60R 13/02; B60R 2013/0287; B60R 13/0243; B60R 13/0256; B60R 13/0262; B60R 16/005; G01D 5/24
See application file for complete search history.

(56) References Cited

U.S. PATENT DOCUMENTS

| | | |
|---|---|---|
| 2015/0311012 A1 | 10/2015 | Wada et al. |
| 2019/0135199 A1* | 5/2019 | Galan Garcia ........ B60K 35/00 |
| 2021/0170728 A1* | 6/2021 | Gerken ................. B60K 35/10 |

FOREIGN PATENT DOCUMENTS

| | | | | |
|---|---|---|---|---|
| DE | 102017203967 A1 * | 9/2018 | ........... | B32B 27/065 |
| DE | 102017116867 A1 | 1/2019 | | |

* cited by examiner

VEHICLE INTERIOR TRIM ELEMENT WITH HAPTIC FEEDBACK FUNCTION

CROSS-REFERENCE TO RELATED APPLICATIONS

This application claims priority to German Patent Application No. 10 2021 214 257.5, filed Dec. 13, 2021, the entire disclosure of which is expressly incorporated herein by reference.

BACKGROUND OF THE INVENTION

The present application relates to a vehicle interior trim element with a haptic feedback function, wherein the vehicle interior trim element itself has a soft feel. The vehicle interior trim element may include a touch-sensitive control element, for example, for controlling a vehicle function.

In the course of increasing digitalization in the automotive sector, both the control options and the sources of distraction in the vehicle interior are growing. Given the increasingly complex environment of vehicle occupants, it may therefore be desirable to simplify controls, minimize any sources of distraction, and/or improve the user experience in general. At the same time, the aesthetic and haptic demands on vehicle interior design are growing, so that surfaces should include as few unevennesses, edges or visual and/or haptic distractions as possible.

In the prior art, for example, vehicle interior trim elements with integrated control elements for controlling vehicle functions are known which also have haptic feedback which, for example, confirms a successful input by means of vibration of the control element and thus improves the user experience, among other things. Typically, these controls are touch-sensitive screens or mechanical switches and thus fixed components with a hard feel.

SUMMARY OF THE INVENTION

In some aspects, it may be desirable to provide haptic feedback in vehicle interior trim elements as well, which themselves have a soft feel and can thus be better integrated into vehicle seats, armrests, center consoles, door panels or vehicle dashboards, for example, without reducing the overall aesthetic and haptic impression.

The attribute "soft" or "soft haptics" as opposed to "hard" or "hard haptics" means that a soft element deforms elastically, for example compressibly elastically, by contact with or by application of adequate local pressure, i.e. essentially within the pressure range. Consequently, an element in question is such that it yields easily under pressure and a change in shape is possible easily and with little force.

In view of the aforementioned aspects, the present disclosure is based on the object of providing an alternative and/or improved vehicle interior trim element that has a haptic feedback function. In some aspects, it may be an object of the present disclosure to provide a vehicle interior trim element, for example a touch-sensitive control element, that has a soft feel. In addition, it may be an object of the present disclosure to provide a vehicle interior trim element that has simplified operability, an improved user experience, in particular a haptic and/or visual user experience, and/or is a reduced source of distraction.

These objects are solved by a vehicle interior trim element according to claim 1. Further embodiments and exemplary embodiments of the disclosure are shown in the dependent claims, the figures and the following description.

The proposed vehicle interior trim element with haptic feedback function includes an elastic base layer, which gives the vehicle interior trim element a soft feel, and a flexible cover layer. The flexible cover layer includes an electrically insulating upper layer disposed on the visible side of the vehicle interior trim element, an electrically conductive sensor layer disposed between the upper layer and the base layer, and a piezoelectric actuator layer disposed between the sensor layer and the base layer. The sensor layer is configured to detect contact with the upper layer without deformation and to localize a corresponding contact area. The actuator layer is configured to provide haptic feedback.

Consequently, a soft vehicle interior trim element is provided that has a feedback function so that operability is simplified and an improved operator experience is provided while reducing sources of distraction. The combination of flexible cover layer and elastic base layer can ensure the soft feel of the vehicle trim element. Deformation-free detection and localization of a touch provides particularly user-friendly operability and further improves the user experience.

The actuator layer may be coupled to the sensor layer and be configured to provide the haptic feedback in the contact area. The haptic feedback may include vibration of the contact area. The vibration may include, for example, dynamic oscillatory deformation and/or movement of the vehicle interior trim element in the contact area, for example at a frequency of 50 to 500 Hz. In some embodiments, the frequency is in the range of 100 to 300 Hz. In the present context, the term "contact area" refers to the substantial area of contact between a human being and the vehicle's interior trim element, for example the visible side, i.e. the upper layer facing the vehicle interior and visible to the driver. Alternatively or additionally, the haptic feedback may also include a static change in shape, for example a one-time bulging in the contact area. It is known that even the smallest changes in shape can be perceived in a tactile manner. For example, differences in height of just a few tenths of a millimeter can already be perceived. This threshold is lowered even further during vibration movements.

Areas outside the contact area can remain essentially free of vibration. This limits the feedback locally. In some aspects in combination with matching local areas between contact detection and/or contact localization and the haptic feedback, the user experience can thus be further improved. In addition, the efficiency of the feedback can be improved because, for example, the entire vehicle interior trim element is not vibrated.

The sensor layer may be a capacitive touch sensor layer that is configured to capacitively detect touch and/or locate the contact area. A capacitive touch sensor layer is particularly well suited for deformation-free touch detection and/or touch localization. In addition, capacitive touch detection, especially in combination with an electrically insulating upper layer, is more resistant to corrosion and/or moisture than, for example, a resistive sensor layer.

The sensor layer may include an electrically conductive pattern. The pattern can be configured to locate areas of contact, for example by means of a grid pattern. The electrically conductive pattern may be a printable electrically conductive pattern. The sensor layer can additionally be configured to detect a touch in a pressure-sensitive manner, i.e. subject to differentiated touch pressures. The additional pressure differentiation can, for example, take place as a function of a deformation of the sensor layer.

The piezoelectric actuator layer may include a plurality of piezo elements. Each piezo element can be assigned to a contact area. The piezo elements can be bending transducer piezo elements. Piezo elements designed as bending transducers can ensure particularly good compatibility of the actuator layer with a soft feel of the vehicle trim element. An actuator layer formed essentially as a bending transducer may additionally comprise a flexible and passive electrically conductive substrate layer. The substrate layer can interact with a piezo layer comprising a piezoelectric material as a bimetal. The substrate layer may be disposed between the base layer and the piezo layer.

The sensor layer may be coupled to the actuator layer via a control device, for example a microcontroller. The control device may include a capacitively actuated control device. The control device may be selectively coupled to the actuator layer. For example, the control device may be configured to selectively control and activate different areas for the haptic feedback, including different piezo elements, of the actuator layer by means of switch elements. The combination of a capacitively actuated control device with a capacitive touch sensor layer and, if necessary, selectively switched piezo elements, including bending transducer piezo elements, is particularly energy-efficient.

In some aspects, each of the layers of the flexible cover layer is an elastic layer. Thus, it can be advantageous if the upper layer, the sensor layer and the actuator layer are elastic layers. This can provide improved haptic properties of the vehicle interior trim element. Alternatively or additionally, this can improve local mechanical decoupling of the haptic feedback. For example, the upper layer may have a modulus of elasticity of 0.01 GPa to 1 GPa, for example, 0.2 GPa. The sensor layer can have a modulus of elasticity of 0.1 GPa to 1 GPa, for example, 0.2 GPa. The actuator layer can have a modulus of elasticity of 0.1 GPa to 1 GPa. Alternatively or additionally, the sensor layer and the actuator layer can be elastically flexible layers.

The base layer can be an elastically compressible layer and have a compression hardness of 1 kPa to 50 kPa. The base layer may comprise a plastic, a knitted fabric, and/or a foam, for example polyethylene (PE), polyethylene terephthalate (PET), polyester (PES), polyamide (PA), polypropylene (PP), polyurethane (PUR), or polyvinyl chloride (PVC).

The upper layer may be a decorative layer and include, for example, leather, a leather imitation, a foil, wood, for example a wood veneer, and/or a textile. The upper layer may comprise a plastic, for example polyethylene (PE), polyethylene terephthalate (PET), polyester (PES), polyamide (PA), polypropylene (PP), polyurethane (PUR), thermoplastic polyolefins (TPO) or polyvinyl chloride (PVC). The upper layer may be a substantially opaque layer and/or include a pattern, particularly a visual pattern, and/or texturing.

It can be advantageous for the upper layer to not be thicker than 2 mm. For example, the upper layer may have a thickness of 0.1 mm to 2 mm, for example, 0.3 mm. For example, the thickness of the upper layer may be selected to realize predetermined haptic properties and functionality of the sensor layer.

The vehicle interior trim element may further comprise a carrier. The base layer can then be arranged between the carrier and the flexible cover layer. The carrier may be a substantially hard and/or rigid carrier. The carrier may comprise a plastic, for example polycarbonate (PC), acrylonitrile butadiene styrene (ABS) or polypropylene (PP). The base layer can be configured to mechanically decouple the carrier from the actuator layer. It can be advantageous if the base layer has a layer thickness of at least 1 mm. For example, the base layer may have a thickness of 1 mm to 5 mm, for example, 3 mm.

The aforementioned layers of the vehicle interior trim element may be at least partially adjoining layers. "Adjoining" means in this case a direct resting and/or mutual contacting of the layers in question. For example, the sensor layer may adjoin the upper layer and/or the actuator layer may adjoin the sensor layer and/or the base layer may adjoin the flexible cover layer and/or the base layer may adjoin the actuator layer and/or the base layer may adjoin a carrier.

In some aspects, the vehicle interior trim element is configured to provide different operating modes. For example, a touch can provide the (pre)selection of a function to be controlled, for example, selecting and setting a seat position control or a climate control, and pressing the flexible cover layer with an adequate touch pressure can provide the confirmation and/or input of the selected and/or selected function. This is made possible by the fact that the sensor layer can already detect and localize contact without deformation. In this case it can be advantageous if the sensor layer is also deformable and the deformation can also be detected, i.e. the sensor layer is additionally configured to detect a predetermined contact pressure.

Several embodiments have been disclosed herein. From the following detailed description, which shows and describes an exemplary embodiment of the disclosure, still other embodiments of the present disclosure will become apparent to the person skilled in the art. Accordingly, the drawings and detailed description are to be regarded in an illustrative rather than a restrictive sense. Recurring features are provided with the same reference signs in the description of the figures.

DETAILED DESCRIPTION

Figure 1:
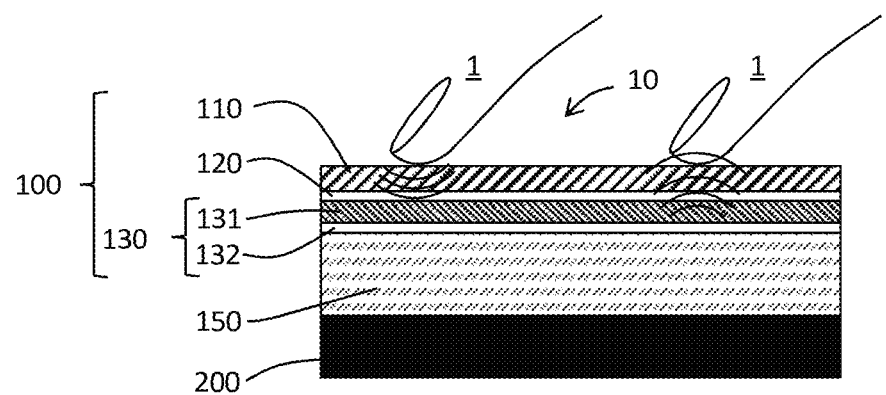
FIG. 1 shows a schematic cross-sectional view of a vehicle interior trim element with haptic feedback function according to the disclosure.
Figure 2:
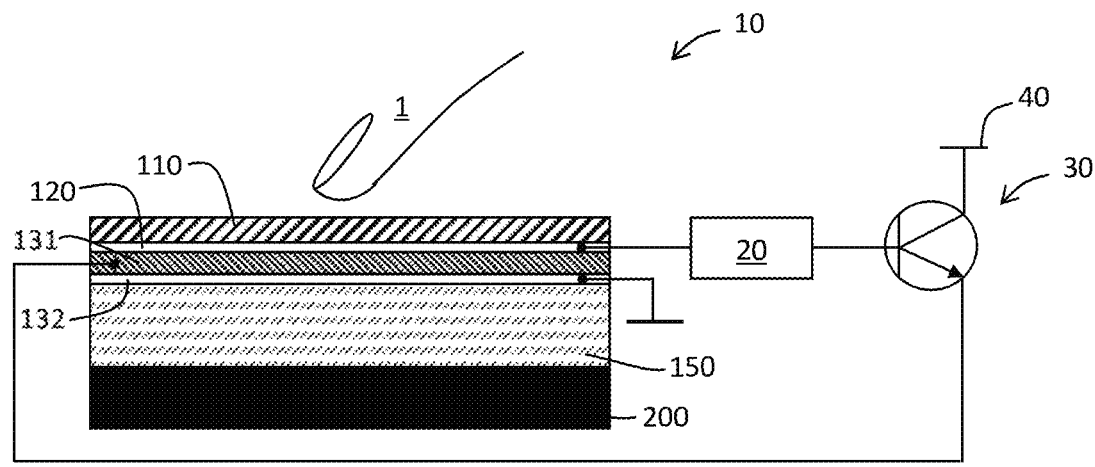
FIG. 2 shows a further development of the vehicle interior trim element of FIG. 1.

The vehicle interior trim element 10 with haptic feedback function shown in FIG. 1 and FIG. 2 comprises an elastic base layer 150, which gives the vehicle interior trim element 10 a soft feel, and a flexible cover layer 100. The elastic base layer 150 may have a thickness between 1 mm and 5 mm, for example 3 mm. The flexible cover layer 100 may have a thickness between 1 mm and 3 mm, for example 2 mm. The flexible cover layer 100 includes an electrically insulating upper layer 110 disposed on the visible side of the vehicle interior trim element 10, an electrically conductive sensor layer 120 disposed between the upper layer 110 and the base layer 150, and a piezoelectric actuator layer 130 disposed between the sensor layer 120 and the base layer 150. The sensor layer 120 is configured to detect, without deformation, a touch by an operating person or operator 1 of the upper layer 110 and to locate a corresponding area of contact. The actuator layer 130 is configured to provide haptic feedback to the operator 1. The contact of the operator 1 detected by the sensor layer 120 is schematically indicated by signal waves turned toward the interior of the vehicle interior trim element 10. The haptic feedback provided by the actuator layer 130 to the operator 1 is schematically indicated by outwardly facing signal waves.

The actuator layer 130 may be coupled to the sensor layer 120 and configured to provide the haptic feedback in the contact area. The haptic feedback may include vibration of the contact area. For example, the vibration may comprise a dynamic oscillatory deformation and/or movement of the vehicle interior trim element 10 in the area of contact, for example at a frequency of from 50 to 500 Hz, including from 100 to 300 Hz. Alternatively or additionally, the haptic feedback may also include a static change in shape, for example a one-time bulging in the contact area. Areas outside the contact area can remain essentially free of vibration.

The sensor layer 120 may be a capacitive touch sensor layer configured to capacitively detect the touch by the operator 1 and/or to locate the contact area. The sensor layer 120 may include an electrically conductive pattern (not shown). The pattern can be configured to locate areas of contact, for example by means of a grid pattern. The electrically conductive pattern may be a printable electrically conductive pattern. The sensor layer 120 may additionally be configured to sense a touch in a pressure-sensitive manner, that is, subject to differentiated touch pressures. The additional pressure differentiation may be performed, for example, as a function of a deformation of the sensor layer 120.

The piezoelectric actuator layer 130 may include a plurality of piezo elements (not shown). Each piezo element can be assigned to a contact area. The actuator layer 130 shown in FIG. 1 is exemplarily provided as a bending transducer actuator layer, wherein the actuator layer 130 comprises a piezo layer 131 and a flexible and passive electrically conductive substrate layer 132. Typically, the piezo layer has a thickness of 0.8 mm to 2.5 mm, for example 1.6 mm. The substrate layer 132 may interact with the piezoelectric layer 131, which comprises a piezoelectric material, as a bimetal. The substrate layer 132 is disposed between the base layer 150 and the piezo layer 131.

In some aspects, as shown in FIG. 2, the sensor layer 120 is coupled to the actuator layer 130 via a control device 20, for example a microcontroller. In an exemplary embodiment, the sensor layer 120 is coupled to the piezoelectric layer 131 via the control device 20 and a switch device 30 including a voltage source 40. The control device 20 may comprise a capacitively actuated control device. The control device 20 may be selectively coupled to the actuator layer 130. For example, the control device 20 may be configured to selectively actuate and activate different areas for haptic feedback, including different piezo elements, of the actuator layer 130 by a plurality of switch elements 30.

In some aspects, each of the layers of the flexible cover layer 100 is an elastic layer. For example, the upper layer 110, the sensor layer 120 and the actuator layer 130, may be elastic layers. The upper layer 110 may, for example, have a modulus of elasticity of 0.01 GPa to 1 GPa, for example, 0.2 GPa. The sensor layer 120 may have a modulus of elasticity of 0.01 GPa to 1 GPa, for example, 0.2 GPa. The actuator layer 130 may have a modulus of elasticity of 0.01 GPa to 1 GPa, for example, 0.2 GPa. Alternatively or additionally, the sensor layer 120 and the actuator layer 130 may be elastically flexible layers.

The base layer 150 may be an elastically compressible layer and have a compression hardness of 1 kPa to 50 kPa, for example, 15 kPa. The base layer 150 may comprise a plastic, a knitted fabric, and/or a foam, for example polyethylene (PE), polyethylene terephthalate (PET), polyester (PES), polyamide (PA), polypropylene (PP), polyurethane (PUR), or polyvinyl chloride (PVC).

The upper layer 110 may be a decorative layer and may comprise, for example, leather, a leather imitation, a foil, wood, for example a wood veneer, and/or a textile. The upper layer 110 may comprise a plastic, for example, polyethylene (PE), polyethylene terephthalate (PET), polyester (PES), polyamide (PA), polypropylene (PP), polyurethane (PUR), thermoplastic polyolefins (TPO), or polyvinyl chloride (PVC). The upper layer 110 may be a substantially opaque layer and/or include a pattern, including a visual pattern, and/or texturing. The upper layer 110 may have a layer thickness of 0.1 mm to 2 mm, for example, 0.3 mm.

The vehicle interior trim element 10 according to the examples of FIGS. 1 and 2 further comprises a carrier 200. The carrier can have a thickness between 1 mm and 5 mm, for example 2.5 mm. The base layer 150 is disposed between the carrier 200 and the flexible cover layer 100. The carrier 200 may be a substantially hard and/or rigid support. The carrier 200 may comprise a plastic, for example polycarbonate (PC), acrylonitrile butadiene styrene (ABS), or polypropylene (PP). The base layer 150 may be configured to mechanically decouple the carrier 200 from the actuator layer 130. The base layer 150 may have a layer thickness of 1 mm to 5 mm, for example, 3 mm.

According to the exemplary embodiments shown herein, the sensor layer 120 adjoins the upper layer 110, the actuator layer 130 adjoins the sensor layer 120, the base layer 150 adjoins the flexible cover layer 100, the base layer 150 adjoins the actuator layer 130, and the base layer 150 adjoins the carrier 200. Further, the piezo layer 131 adjoins the sensor layer 120, the substrate layer 132 adjoins the piezo layer 131, and the base layer 150 adjoins the substrate layer 132.

The vehicle interior trim element 10 may include a control element. It may be provided that the vehicle interior trim element 10 is arranged to provide different operating modes. For example, a touch of the operator 1 may provide selection and/or adjustment of a function to be controlled, for example, selection and adjustment of a seat position control or a climate control, and a depression of the flexible cover layer 100 with an adequate touch pressure may provide confirmation and/or input of the selected and/or adjusted function.

What is claimed is:

1. A vehicle interior trim element with haptic feedback function, comprising:
    an elastic base layer configured to give the vehicle interior trim element a soft feel,
    a flexible cover layer comprising an electrically insulating upper layer disposed on a visible side of the vehicle interior trim element, an electrically conductive sensor layer disposed between the upper layer and the base layer, a piezoelectric actuator layer disposed between the sensor layer and the base layer, wherein
    the sensor layer is configured to detect a contact of the upper layer without deformation and to locate a corresponding contact area, and wherein
    the actuator layer is configured to provide haptic feedback.

2. The vehicle interior trim element of claim 1, wherein the actuator layer is coupled to the sensor layer and configured to provide the haptic feedback in the contact area, and the haptic feedback comprises vibration of the contact area while leaving areas outside the contact area substantially free of vibration.

3. The vehicle interior trim element according to claim 1, wherein the sensor layer is a capacitive touch sensor layer configured to capacitively detect the contact and/or locate the contact area.

4. The vehicle interior trim element according to claim 1, wherein the sensor layer comprises an electrically conductive pattern arranged to locate contact areas.

5. The vehicle interior trim element according to claim 1, wherein the piezoelectric actuator layer comprises a plurality of bending transducer piezoelectric elements, each of the plurality of piezoelectric elements being associated with a contact area.

6. The vehicle interior trim element according to claim 1, wherein each of the upper layer, the sensor layer and the actuator layer is an elastically flexible layer.

7. The vehicle interior trim element according to claim 1, wherein the base layer is an elastically compressible layer.

8. The vehicle interior trim element of claim 7, wherein the base layer has a compression hardness of 1 kPa to 50 kPa.

9. The vehicle interior trim element of claim 8, wherein the compression hardness is 15 kPa.

10. The vehicle interior trim element according to claim 1, wherein the upper layer is a decorative layer and comprises one or more of a leather layer, a faux leather layer, a foil layer, a wood layer, a wood veneer, and a textile layer.

11. The vehicle interior trim element according to claim 1, further comprising a carrier, wherein the base layer is arranged between the carrier and the flexible cover layer.

12. The vehicle interior trim element of claim 11, wherein the base layer is adapted to mechanically decouple the carrier from the actuator layer.

13. The vehicle interior trim element according to claim 1, wherein the sensor layer adjoins the upper layer and/or the actuator layer.

14. The vehicle interior trim element of claim 1, wherein the upper layer has a modulus of elasticity of 0.01 GPa to 1 GPa, and/or the sensor layer has a modulus of elasticity of 0.01 GPa to 1 GPa, and/or the actuator layer has a modulus of elasticity of 0.01 GPa to 1 GPa.

15. The vehicle interior trim element of claim 1, wherein the base layer has a thickness of 1 mm to 5 mm.

16. The vehicle interior trim element of claim 15, wherein the thickness is 3 mm.

17. The vehicle interior trim element of claim 1, wherein the base layer adjoins the flexible cover layer.

18. The vehicle interior trim element of claim 1, wherein the base layer adjoins the actuator layer.

19. The vehicle interior trim element of claim 1, wherein the base layer adjoins a carrier.

20. The vehicle interior trim element of claim 1, wherein the upper layer is substantially opaque or comprises a visual and/or a texturing pattern.

\* \* \* \* \*